US012774630B2

(12) United States Patent
Tatsumoto et al.

(10) Patent No.: US 12,774,630 B2
(45) Date of Patent: Oct. 27, 2026

(54) INFORMATION PROCESSING APPARATUS

(71) Applicant: TOYOTA JIDOSHA KABUSHIKI KAISHA, Toyota (JP)

(72) Inventors: Yuki Tatsumoto, Seto (JP); Josuke Yamane, Nagoya (JP); Hirotaka Nogami, Nisshin (JP); Kazuya Nishimura, Anjo (JP); Takumi Fukunaga, Iwakura (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 52 days.

(21) Appl. No.: 18/911,242

(22) Filed: Oct. 10, 2024

(65) Prior Publication Data

US 2025/0146351 A1 May 8, 2025

(30) Foreign Application Priority Data

Nov. 7, 2023 (JP) ................................ 2023-190232

(51) Int. Cl.
*E05F 15/70* (2015.01)
*B60R 16/037* (2006.01)

(52) U.S. Cl.
CPC ............ *E05F 15/70* (2015.01); *B60R 16/037* (2013.01); *E05Y 2900/55* (2013.01)

(58) Field of Classification Search
CPC ..... E05F 15/70; B60R 16/037; E05Y 2900/55
See application file for complete search history.

(56) References Cited

U.S. PATENT DOCUMENTS

| | | | | |
|---|---|---|---|---|
| 6,304,173 | B2 * | 10/2001 | Pala | B60R 11/0235 348/148 |
| 2007/0040910 | A1 * | 2/2007 | Kuwata | B60R 1/008 348/148 |
| 2017/0313248 | A1 * | 11/2017 | Kothari | H04N 23/67 |
| 2018/0065504 | A1 * | 3/2018 | Lan | B60W 10/30 |
| 2020/0130702 | A1 * | 4/2020 | Ferreira | H04W 4/48 |
| 2022/0016999 | A1 * | 1/2022 | Burk | B60N 2/0273 |
| 2022/0355710 | A1 * | 11/2022 | Salter | B60N 2/0025 |
| 2023/0055043 | A1 | 2/2023 | Katayama | |
| 2024/0399986 | A1 * | 12/2024 | Bennie | G06V 20/59 |
| 2025/0058730 | A1 * | 2/2025 | Shimizu | G06F 3/013 |

FOREIGN PATENT DOCUMENTS

| | | | | | |
|---|---|---|---|---|---|
| CN | 112141027 | A | * | 12/2020 | B60R 16/0231 |
| JP | 2010100125 | A | | 5/2010 | |
| JP | 2013029004 | A | | 2/2013 | |
| JP | 2021032011 | A | * | 3/2021 | |
| JP | 2023028504 | A | | 3/2023 | |
| KR | 20060066758 | A | * | 6/2006 | B60J 1/17 |
| KR | 100765823 | B1 | * | 10/2007 | E05F 15/697 |

* cited by examiner

*Primary Examiner* — Helal A Algahaim
(74) *Attorney, Agent, or Firm* — KENJA IP LAW PC

(57) ABSTRACT

An information processing apparatus includes a controller configured to store attribute information for an occupant who may board a vehicle and setting information for a power window to correspond with each other, acquire attribute information for an occupant seated in a seat of the vehicle, and control driving of a power window corresponding to the seat using setting information corresponding to the acquired attribute information.

9 Claims, 4 Drawing Sheets

INFORMATION PROCESSING APPARATUS

CROSS-REFERENCE TO RELATED APPLICATION

This application claims priority to Japanese Patent Application No. 2023-190232 filed on Nov. 7, 2023, the entire contents of which are incorporated herein by reference.

TECHNICAL FIELD

The present disclosure relates to an information processing apparatus.

BACKGROUND

Technology related to the control of the opening and closing of vehicle power windows is known. For example, Patent Literature (PTL) 1 discloses automatically controlling the opening and closing of power windows and setting power window opening based on temperature, aerosol amount, air quality, weather, and the like at IG-ON.

CITATION LIST

Patent Literature

PTL 1: JP 2023-028504 A

SUMMARY

However, the control of power windows according to the occupant or the like is not considered in PTL 1. In other words, there is room for improvement in the technology related to the control of the opening and closing of vehicle power windows.

It would be helpful to improve technology related to the control of the opening and closing of vehicle power windows.

An information processing apparatus according to an embodiment of the present disclosure includes a controller configured to:

- store attribute information for an occupant who may board a vehicle and setting information for a power window to correspond with each other;
- acquire attribute information for an occupant seated in a seat of the vehicle; and
- control driving of a power window corresponding to the seat using setting information corresponding to the acquired attribute information.

According to an embodiment of the present disclosure, technology related to the control of the opening and closing of vehicle power windows is improved.

DETAILED DESCRIPTION

Hereinafter, an embodiment of the present disclosure will be described.

Outline of Embodiment

Figure 1:
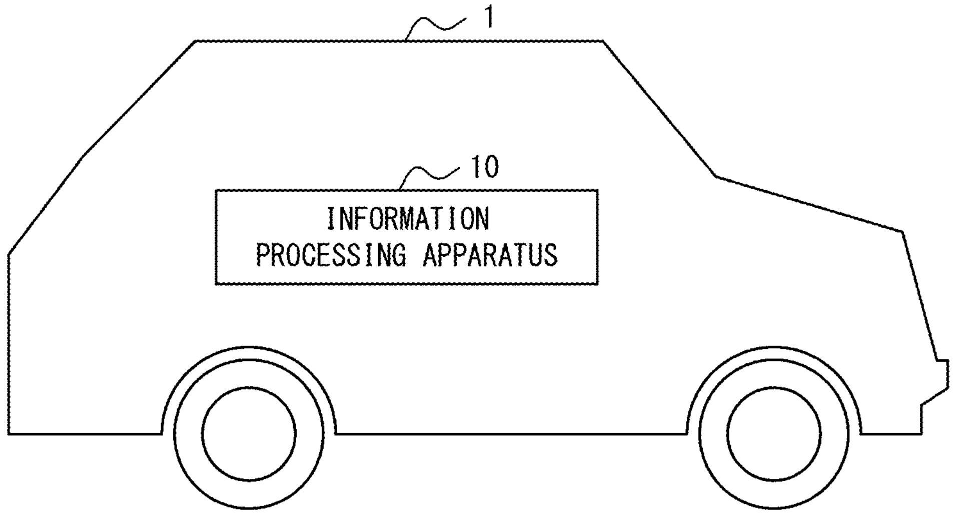
FIG. 1 is a block diagram illustrating a schematic configuration of technology according to an embodiment of the present disclosure.

An outline of technology according to an embodiment of the present disclosure will be described with reference to FIG. 1. The technology according to the embodiment of the present disclosure includes a vehicle 1 and an information processing apparatus 10 mounted in the vehicle 1.

The vehicle 1 is an automobile, for example, but is not limited to this and may be any appropriate vehicle. The automobile is, for example, a gasoline vehicle, a battery electric vehicle (BEV), a hybrid electric vehicle (HEV), a plug-in hybrid electric vehicle (PHEV), a fuel cell electric vehicle (FCEV), or the like, but is not limited to these.

The information processing apparatus 10 is any apparatus to be used by an occupant in the vehicle 1. For example, a dedicated in-vehicle device can be employed as the information processing apparatus 10. The information processing apparatus 10 may be a general purpose electronic device such as a smartphone or tablet terminal.

First, an outline of the present embodiment will be described, and details thereof will be described later. The information processing apparatus 10 stores in advance attribute information for an occupant who may board a vehicle and setting information for a power window to correspond with each other. The information processing apparatus 10 acquires attribute information for an occupant seated in a seat of the vehicle. The information processing apparatus 10 then controls driving of the power window corresponding to the seat using the setting information corresponding to the acquired attribute information.

Thus, according to the present embodiment, the information processing apparatus 10 acquires attribute information for the occupant who may board the vehicle, and controls driving of the power window corresponding to the seat using the setting information corresponding to the attribute information. Thus, the technology related to the control of the opening and closing of vehicle power windows is improved in that the driving of the power windows can be controlled adaptively according to the attributes of the occupants who may board the vehicle.

Next, configurations of the information processing apparatus 10 according to the embodiment of the present disclosure will be described in detail.

(Configuration of Information Processing Apparatus)

Figure 2:
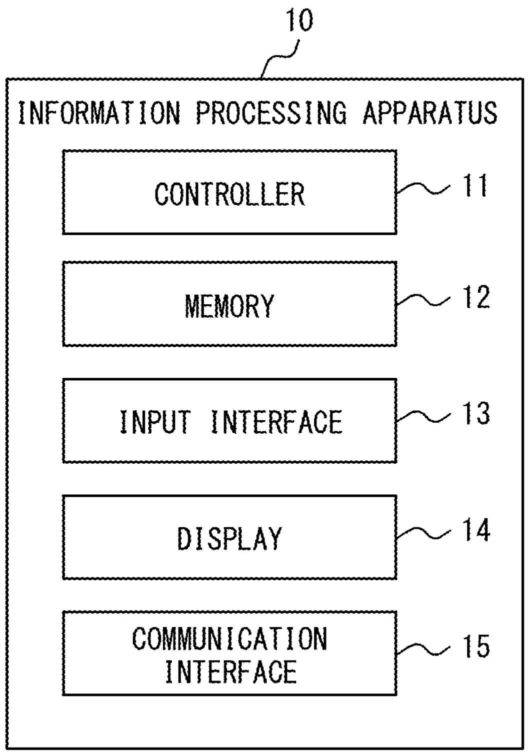
FIG. 2 is a block diagram illustrating a schematic configuration of an information processing apparatus.

As illustrated in FIG. 2, the information processing apparatus 10 includes a controller 11, a memory 12, an input interface 13, a display 14, and a communication interface 15.

The controller 11 includes at least one processor, at least one dedicated circuit, or a combination thereof. The processor is a general purpose processor, such as a central processing unit (CPU) or a graphics processing unit (GPU), or a dedicated processor specialized for particular processing. The dedicated circuit is, for example, a field-programmable gate array (FPGA) or an application specific integrated circuit (ASIC). The controller 11 executes processes related to operations of the information processing apparatus 10 while controlling components of the information processing apparatus 10.

The memory 12 includes at least one semiconductor memory, at least one magnetic memory, at least one optical memory, or a combination of at least two of these. The semiconductor memory is, for example, random access memory (RAM) or read only memory (ROM). The RAM is, for example, static random access memory (SRAM) or dynamic random access memory (DRAM). The ROM is, for example, electrically erasable programmable read only memory (EEPROM). The memory 12 functions as, for example, a main memory, an auxiliary memory, or a cache memory. The memory 12 stores data to be used in the operations of the information processing apparatus 10 and data obtained by the operations of the information processing apparatus 10.

The input interface 13 includes at least one interface for input. The interface for input is, for example, a physical key, a capacitive key, a pointing device, or a touch screen integrally provided with a display. The interface for input may be, for example, a sound sensor that accepts audio input, a camera that accepts gesture input, or the like. The input interface 13 accepts an operation for inputting data to be used for the operations of the information processing apparatus 10. The input interface 13 may be connected to the information processing apparatus 10 as an external input device, instead of being included in the information processing apparatus 10. As the connection method, for example, any method such as Universal Serial Bus (USB), High-Definition Multimedia Interface (HDMI®) (HDMI is a registered trademark in Japan, other countries, or both), or Bluetooth® can be used.

The display 14 includes at least one interface for display output. The interface for display output is, for example, a display for outputting information in the form of an image, or the like. The display is, for example, a liquid crystal display (LCD) or an organic electro luminescent (EL) display. The display 14 displays and outputs data obtained by the operations of the information processing apparatus 10. The display 14 may be connected to the information processing apparatus 10 as an external output device, instead of being included in the information processing apparatus 10. As the connection method, any technology such as USB, HDMI® (HDMI is a registered trademark in Japan, other countries, or both), or Bluetooth® (Bluetooth is a registered trademark in Japan, other countries, or both) can be used. The display 14 may be located in a position visible from the driver's seat of the vehicle 1.

The communication interface 15 includes at least one interface for external communication. The interface for communication may be either a wired or wireless communication interface. For wired communication, the interface for communication is, for example, a Local Area Network (LAN) interface or Universal Serial Bus (USB). For wireless communication, the interface for communication is, for example, an interface compliant with a mobile communication standard such as a Long Term Evolution (LTE), the 4th generation (4G) standard, or the 5th generation (5G) standard, or an interface compliant with a short-range wireless communication standard such as Bluetooth® (Bluetooth is a registered trademark in Japan, other countries, or both). The communication interface 15 receives data to be used for the operations of the information processing apparatus 10, and transmits data obtained by the operations of the information processing apparatus 10.

The functions of the information processing apparatus 10 may be implemented by a processor corresponding to the controller 11 executing a program according to the present embodiment. That is, the functions of the information processing apparatus 10 are realized by software. The program causes a computer to execute the operations of the information processing apparatus 10, thereby causing the computer to function as the information processing apparatus 10. That is, the computer executes the operations of the information processing apparatus 10 in accordance with the program to thereby function as the information processing apparatus 10.

In the present embodiment, the program can be recorded on a computer readable recording medium. The computer readable recording medium includes a non-transitory computer readable medium and is, for example, a magnetic recording apparatus, an optical disc, a magneto-optical recording medium, or a semiconductor memory. The program is distributed, for example, by selling, transferring, or lending a portable recording medium such as a digital versatile disc (DVD) or a compact disc read only memory (CD-ROM) on which the program is recorded. The program may also be distributed by storing the program in a storage of an external server and transmitting the program from the external server to another computer. The program may be provided as a program product.

Some or all of the functions of the information processing apparatus 10 may be realized by a dedicated circuit corresponding to the controller 11. That is, some or all of the functions of the information processing apparatus 10 may be realized by hardware.

(Operations of Information Processing Apparatus)

Figure 3:
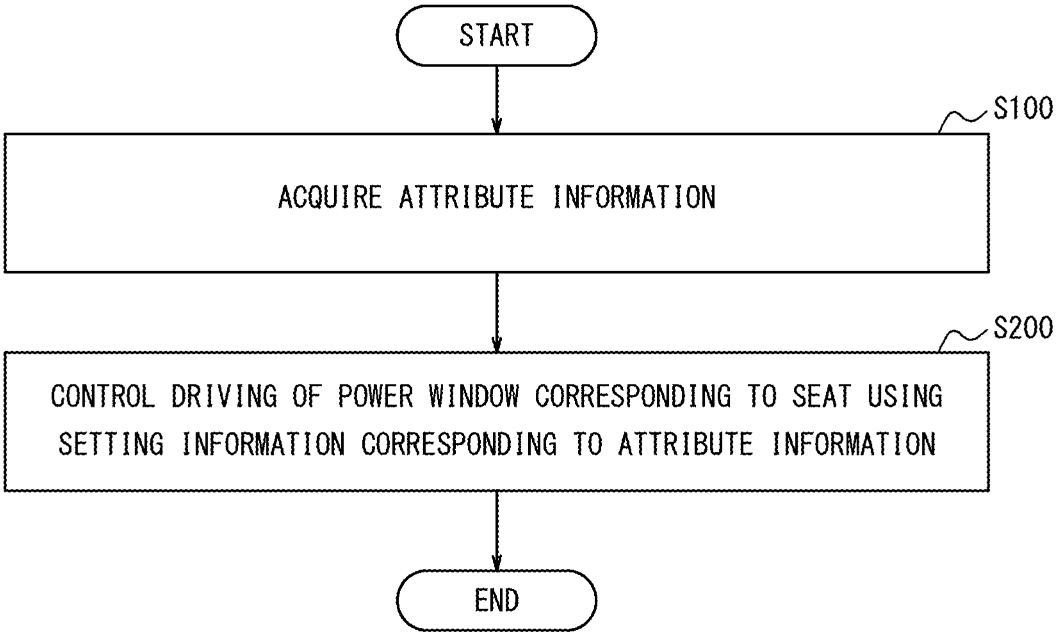
FIG. 3 is a flowchart illustrating operations of the information processing apparatus.

The operations of the information processing apparatus 10 according to the present embodiment will be described with reference to FIG. 3. The memory 12 of the information processing apparatus 10 stores in advance the attribute information for the occupants who may board the vehicle and the setting information for the power windows to correspond with each other. Here the attribute information includes any information for occupants relevant to the setting of the power windows. For example, attribute information may include identifying information such as username, and user category information such as adult, child, pet, etc. The setting information for the power windows includes the setting of upper limits of power window opening, the setting to allow manual open/close operation only from the driver's seat, and the notification setting.

Step S100: The controller 11 of the information processing apparatus 10 acquires attribute information for occupants seated in the seats of the vehicle 1. The target seats from which attribute information is acquired may be all seats or a subset of seats. In the present embodiment, the controller 11 shall acquire attribute information for all seats in the vehicle 1. In other words, in the present embodiment, the controller 11 shall acquire attribute information for each occupant seated in each seat of the vehicle 1.

Any method can be employed to acquire the attribute information for the occupants. For example, the controller 11 may automatically acquire the attribute information for the occupants from sensors or other sources via the communication interface 15. Alternatively, the controller 11 may acquire the attribute information for the occupant based on the user's input operation to the input interface 13.

Figure 4:
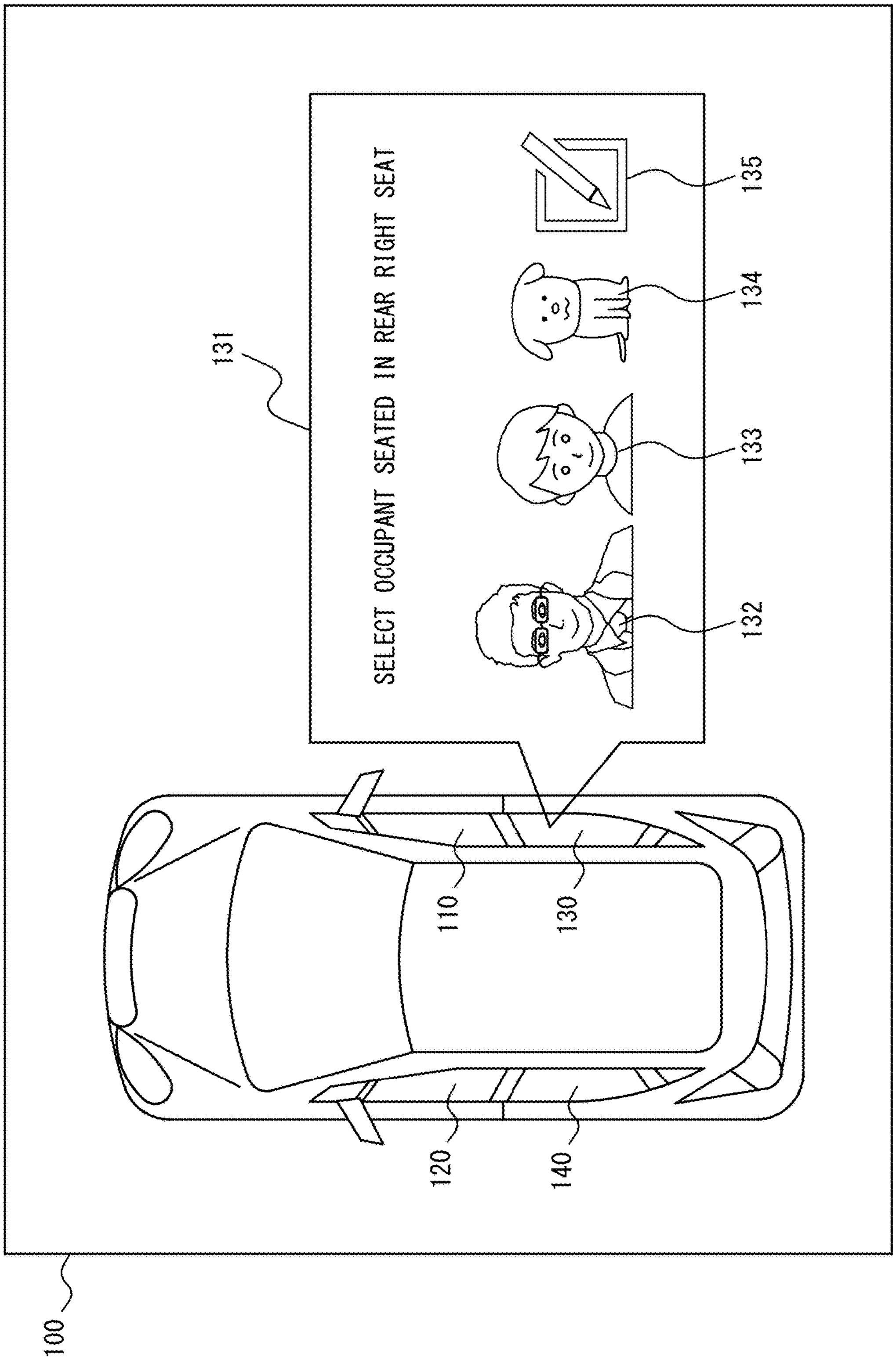
FIG. 4 is a diagram illustrating an example of a user interface.

For example, any user interface can be adopted for the input operation. FIG. 4 illustrates an example of such a user interface 100. The user interface 100 includes objects 110, 120, 130, and 140 that indicate the power windows corresponding to each seat of the vehicle 1. Each object is displayed in a selectable manner by tapping, etc. In FIG. 4, the object 130 is selected. When the object 130 is selected, the attribute information for the occupant of the seat corresponding to the power window (rear right seat) can be entered. For example, when the object 130 is selected, a pop-up 131 may be displayed, and the attribute information for the occupant may be entered by means of the pop-up 131. The pop-up 131 includes icons 132, 133, 134, and 135 corresponding to the attribute information for the occupant. When the icon 132 is selected, "adult" is set as the attribute information for the occupant seated in the seat. When the icon 133 is selected, "child" is set as the attribute information for the occupant seated in the seat. When the icon 134 is selected, "Pet" is set as the attribute information for the occupant seated in the seat. When the icon 135 is selected, the attribute information for the occupant seated in the seat can be customized as desired. For example, a username can be set as the attribute information for the occupant.

Step S200: The controller 11 controls driving of the power window corresponding to the seat using the setting information corresponding to the attribute information acquired in step S100.

Here, the correspondence between the attribute information and the setting information for the power windows may be stored in the memory 12, for example, in the form of a table. Table 1 illustrates an example of a correspondence table.

TABLE 1

| Attribute Information | Setting Information |
|---|---|
| Adult | No power window restrictions |
| Child | Upper limit of power window opening is a first predetermined value, with a notification setting |
| Pet | Upper limit of power window opening is a second predetermined value, with a notification setting |
| User A | Manual open/close operation allowed only from the driver's seat |
| . . . | . . . |

When the correspondence table illustrated in Table 1 is stored in the memory 12, the controller 11 controls driving of the power window corresponding to the seat using the setting information corresponding to the attribute information based on the correspondence table. For example, if the attribute information is adult, the controller 11 controls driving of the power windows without restrictions. In other words, in this case, the occupant seated in the seat can freely operate the power window opening, etc. For example, if the attribute information is child, the controller 11 controls driving using a first predetermined value as the upper limit of the power window opening and with a notification setting. The first predetermined value may be set freely, e.g., 50%. In this way, the power window opening is limited and controlled by the drive control, reducing the risk of children putting their faces, hands, etc. out of the power window. The notification setting includes, for example, a setting to notify prior to driving of the power window. Such a notification setting allows the driver and others to know that the operation will be performed before the child or others open the power window.

For example, if the attribute information is pet, the controller 11 controls driving of a power window using a second predetermined value as the upper limit of the power window opening and with a notification setting. The second predetermined value may be the same as or different from the first predetermined value. In this way, the power window opening is limited and controlled by the drive, reducing the risk of pets jumping out of the power window, etc.

For example, if the attribute information is a specific username (in this case, user A), the controller 11 controls the driving of the power window, assuming that manual open/close operation is allowed only from the driver's seat.

As described above, according to the information processing apparatus 10 according to the present embodiment, the information processing apparatus 10 acquires attribute information for the occupant who may board the vehicle, and controls driving of the power window corresponding to the seat using the setting information corresponding to the attribute information. Thus, the technology related to the control of the opening and closing of vehicle power windows is improved in that the driving of the power windows can be controlled adaptively according to the attributes of the occupants who may board the vehicle.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

Here, the controller 11 may visually display the status of the rear seat by means of the display 14. For example, the controller 11 may use the display 14 to show the power window opening, or whether a child or pet is near the power window. In this way, the driver can easily monitor the rear seats from the driver's seat.

Here, the user may be allowed to set the attribute information and the setting information manually to correspond with each other according to the screen display. In other words, the user may be allowed to set the attribute information and the setting information to correspond with each other. For example, a user interface showing the correspondence table may be displayed on the display 14. In addition, the setting information corresponding to each attribute information may be freely editable.

For example, specific attribute information may be automatically set to correspond to specific setting information. Such specific attribute information may include children or pets. The specific setting information may be a setting of the upper limit of the power window opening. Specific setting information may also be a setting that allows manual open/close operation only from the driver's seat, or a setting that notifies the user if a child or pet is near the power window before driving of the power window.

For example, if a predetermined object is detected in the vicinity of the vehicle 1, the controller 11 may control the power window of the seat closest to the object to open. Prescribed objects may include parking ticket issuing machines or bar gates. In this case, the controller 11 may control driving of the power window according to the setting information corresponding to the attribute information for the occupant seated in the seat of the power window. Alternatively, the controller 11 may control the power window to fully open regardless of the attribute information for the occupant seated in the seat at the power window. In other words, in this case, the controller 11 may control the power window of the seat closest to the object to open as an exception process.

The invention claimed is:

1. An information processing apparatus comprising a controller, a memory, and a display, wherein the memory is configured to store first attribute information for occupants who may board a vehicle and setting information for power windows the setting information each corresponding to respective first attribute information, and wherein the controller is configured to:

cause the display to display a plurality of selectable objects each indicating a power window respectively corresponding to a seat of the vehicle;

in response to a selection of one of the selectable objects, cause the display to display a pop-up including a plurality of icons each corresponding to respective first attribute information;

in response to a selection of one of the icons, set the first attribute information corresponding to the selected icon as second attribute information for an occupant seated in the seat;

control driving of the power window corresponding to the seat using the setting information corresponding to the second attribute information; and wherein the setting information includes a notification setting for performing notification before driving of the power window, and the controller performs notification before the power window of the seat is driven in a case where the notification setting is included in the setting information corresponding to the second attribute information.

2. The information processing apparatus according to claim 1; wherein the controller is configured to cause the display to display a status of a rear seat.

3. The information processing apparatus according to claim 1, wherein the first attribute information and the setting information can be set by a user to correspond with each other.

4. The information processing apparatus according to claim 1, wherein specific setting information of the setting information is automatically set to correspond to specific first attribute information of the first attribute information.

5. The information processing apparatus according to claim 4, wherein the specific setting information is a setting of an upper limit of power window opening.

6. An information processing apparatus comprising a controller, a memory, and a display, wherein the memory is configured to store attribute information for occupants who may board a vehicle and setting information for power windows, the setting information each corresponding to respective attribute information, and wherein the controller is configured to:

acquire attribute information for an occupant seated in a seat of the vehicle from among the attribute information stored in the memory; and control driving of a power window corresponding to the seat using the setting information corresponding to the acquired attribute information, and wherein the controller is further configured to cause the display to visually display a status of a rear seat, the status including at least one of (I) an opening degree of a power window corresponding to the rear seat and (ii) whether a child or a pet is near the power window corresponding to the rear seat; and wherein the setting information includes a notification setting for performing notification before driving of the power window, and the controller performs notification before the power window of the seat is driven in a case where the notification setting is included in the setting information corresponding to the acquired attribute information.

7. The information processing apparatus according to claim 6, wherein the attribute information and the setting information can be set by a user to correspond with each other.

8. The information processing apparatus according to claim 6, wherein specific setting information of the setting information is automatically set to correspond to specific attribute information of the attribute information.

9. The information processing apparatus according to claim 8, wherein the specific setting information is a setting of an upper limit of power window opening.

* * * * *